United States Patent
Hineno et al.

[11] Patent Number: 5,550,798
[45] Date of Patent: Aug. 27, 1996

[54] ENHANCED OPTICAL BEAM SPLITTER TO INCREASE THE KERR ROTATION ANGLE

[75] Inventors: Satoshi Hineno, Kanagawa; Nobuhiko Ando, Tokyo, both of Japan

[73] Assignee: Sony Corporation, Tokyo, Japan

[21] Appl. No.: 224,344

[22] Filed: Apr. 7, 1994

[30] Foreign Application Priority Data

Apr. 13, 1993 [JP] Japan .................. 5-109883
Apr. 23, 1993 [JP] Japan .................. 5-120776

[51] Int. Cl.$^6$ ............................................ G11B 7/135
[52] U.S. Cl. ............ 369/110; 396/112; 396/13; 396/44.23
[58] Field of Search .................. 369/13, 110, 112, 369/116, 44.14, 44.23; 360/114; 359/328, 485, 487

[56] References Cited

U.S. PATENT DOCUMENTS

| | | | |
|---|---|---|---|
| 4,561,032 | 12/1985 | Matsumoto et al. | 360/114 |
| 4,771,414 | 9/1988 | Yoshimatsu | 369/110 |
| 4,951,274 | 8/1990 | Iwanaga et al. | 369/13 |
| 5,073,879 | 12/1991 | Ando et al. | 369/13 |
| 5,394,381 | 2/1995 | Fukumoto et al. | 369/13 |
| 5,404,490 | 4/1995 | Matsubayashi et al. | 369/110 |
| 5,406,532 | 4/1995 | Nishikawa | 369/110 |
| 5,467,336 | 11/1995 | Ando et al. | 369/112 |

FOREIGN PATENT DOCUMENTS

| | | |
|---|---|---|
| 0141679A3 | 5/1985 | European Pat. Off. .......... G11B 11/10 |
| 0264285A2 | 4/1988 | European Pat. Off. .......... G11B 11/10 |
| 0405444A2 | 2/1991 | European Pat. Off. .......... G11B 7/09 |

*Primary Examiner*—Georgia Y. Epps
*Assistant Examiner*—Kim-Kwok Chu
*Attorney, Agent, or Firm*—Limbach & Limbach L.L.P.; Philip M. Shaw, Jr.

[57] ABSTRACT

An optical head apparatus for a magneto-optical recording medium including a light beam source, an objective lens, a separating optical system, and a photodetector. The objective lens is provided for irradiating an output light beam from the light beam source as a focused light beam to the surface of the signal recording surface of the magneto-optical recording medium. The separating optical system separates the light beam radiated from the light beam source from a reflected light beam reflected by the signal recording surface of the magneto-optical recording medium via the objective lens. The photodetector receives the reflected light beam thus separated by the separating optical system. The separating optical system also includes an enhancement element which apparently increases the Kerr rotation angle of the reflected light beam.

14 Claims, 8 Drawing Sheets

ENHANCED OPTICAL BEAM SPLITTER TO INCREASE THE KERR ROTATION ANGLE

BACKGROUND

1. Field of the Invention

The present invention relates to an optical head. More particularly, the present invention relates to an optical head for recording signals onto an optical recording medium such as a magneto-optical recording medium, or for reading signals therefrom.

2. Background of the Invention

Figure 1:
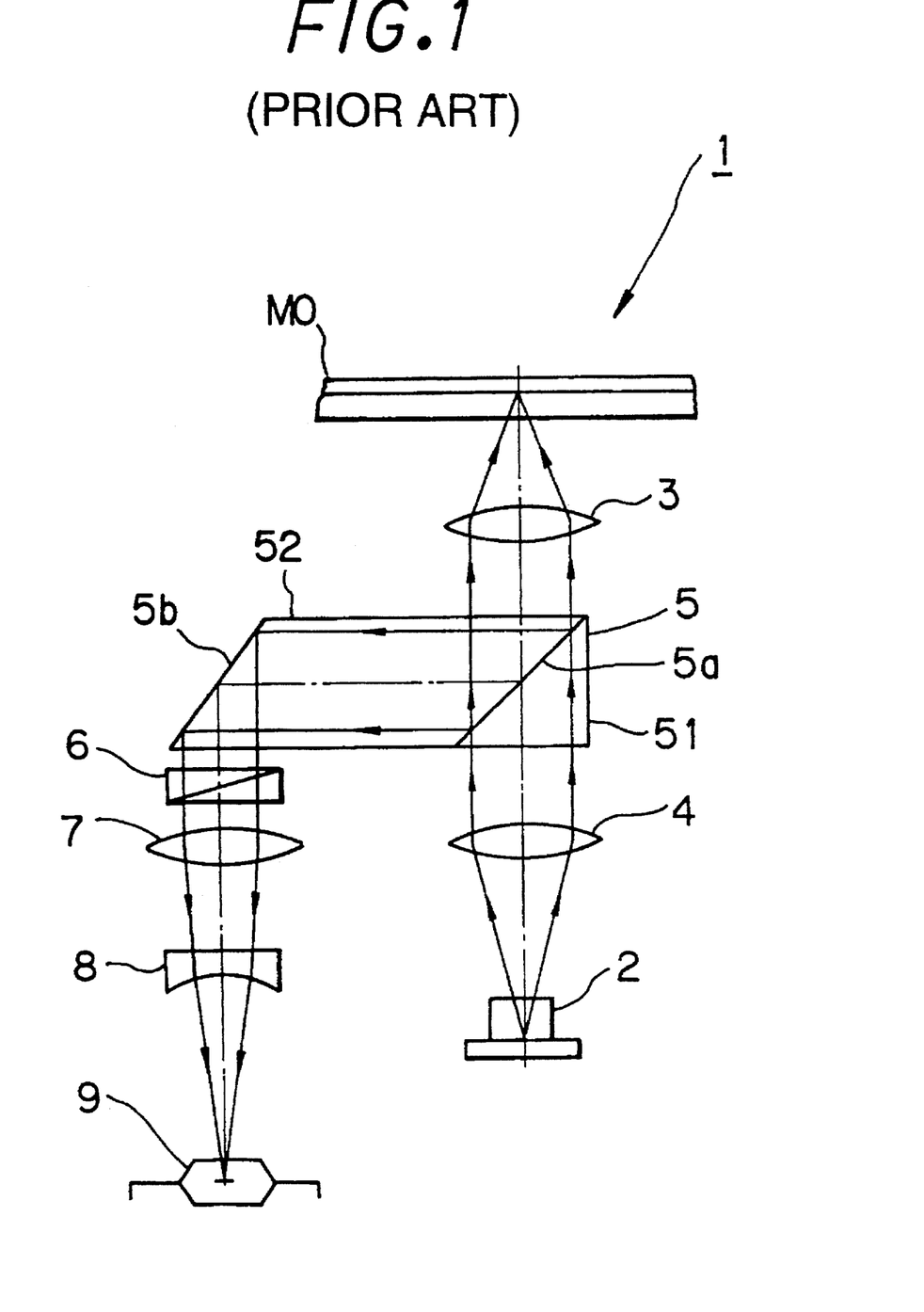
FIG. 1 shows a schematically drawn structure of a prior art optical head.

In the case of an optical head for reading out information signals from a rewritable magneto-optical disc they can be fabricated, for example, into a structure illustrated in FIG. 1. Referring to FIG. 1, an optical head 1 includes a number of optical elements described below. A light beam, emitted from a semiconductor laser element 2 as a light beam source, is introduced into an objective lens 3, so that the light beam can be converged on the signal recording surface of the magneto-optical disc MO. The divergent light beam which is emitted from the semiconductor laser element 2 is converted into parallel light beams by a collimator lens 4. A beam splitter 5, which includes an optical prism (hereinafter referred to simply as a "prism") 51 adhered to an optical element 52 having its edges arranged in parallel with each other, separates the light beam into emitted for the semiconductor laser element 1 from a reflected light beam, i.e., a light beam reflected by the signal recording surface of the magneto-optical disc MO. In further detail, the beam splitter 5 has a multilayered dielectric layer in the boundary plane between the prism 51 and the optical element 52, that is, between the facet (edge plane) 5a of the optical element and the prism 51. This multilayered dielectric layer transmits the P-polarization component, but reflects the S-polarization component. A total reflection film which completely reflects the reflected light beam from the recording surface of the magneto-optical disc MO is provided on the other facet (edge plane) 5b of the optical element 52. The dielectric layer and the total reflection film are provided by means of vapor deposition and the like. A Wollaston prism 6 is provided to emit a plurality of beams based on the aforementioned reflected light beam from the signal recording surface. A Wollaston prism as disclosed, for example, in U.S. Pat. No. 4,771,414 can be used in the present invention. The plurality of beams discharged from the Wollaston prism 6 are focused on the photodetector 9 by means of an imaging lens 7. A multi-purpose lens 8 is placed between the imaging lens 7 and the photodetector 9 to generate astigmatism for the detection of focusing error. Furthermore, since the multi-purpose lens 8 includes a concave plane on the output side, the optical path of the reflected light beam between the output end plane of the beam splitter 5 and the photodetector 9 can be shortened. The photodetector 9 has a plurality of photoreceptors for generating each of the following error signals; a focusing error signal and a tracking error signal. Then, signals according to the read-out signal from the information signal recorded on the signal recording surface of a magneto-optical disc MO are generated based on the detection signal provided by the photodetector 9.

According to the optical head 1 according to the constitution above, the divergent P-polarization light beam emitted from a semiconductor laser element 1 is converted into parallel light beams by a collimator lens 4. The output light beam from the collimator lens 4 is then focused to one point on the signal recording surface of the magneto-optical disc MO by the objective lens 3 that is provided after the beam splitter 5. The light beams inclusive of the S-polarization component and the reflected light beam, which had been reflected by the signal recording surface of the magneto-optical disc MO, are again introduced to the beam splitter 51 via the objective lens 3. Then, the light beams are reflected by the boundary plane of the beam splitter and deflected in their optical path polarization at an angle of 90°. They are further reflected completely and further deflected at the angle to 90° at the face 5b of the optical element 52. The Wollaston prism 6 emits a plurality of light beams according to the light beam irradiated by the beam splitter 5, so that the plurality of light beams which are provided to the photodetector 9 via a multi-purpose lens 8 might be focused on each of the photoreceptors of the photodetector 9. It should be noted that the light beam passed through the multi-purpose lens 8 has stigmatic aberration. Then, signals such as the signals read out from the magneto-optical disc MO, the focusing error signal, and the tracking error signal, are generated based on the detected signals from each of the photoreceptor planes of the photodetector 9. The signals recorded on the magneto-optical disc MO are read out based on the optical rotation of the beam according to Kerr effect.

Figure 2:
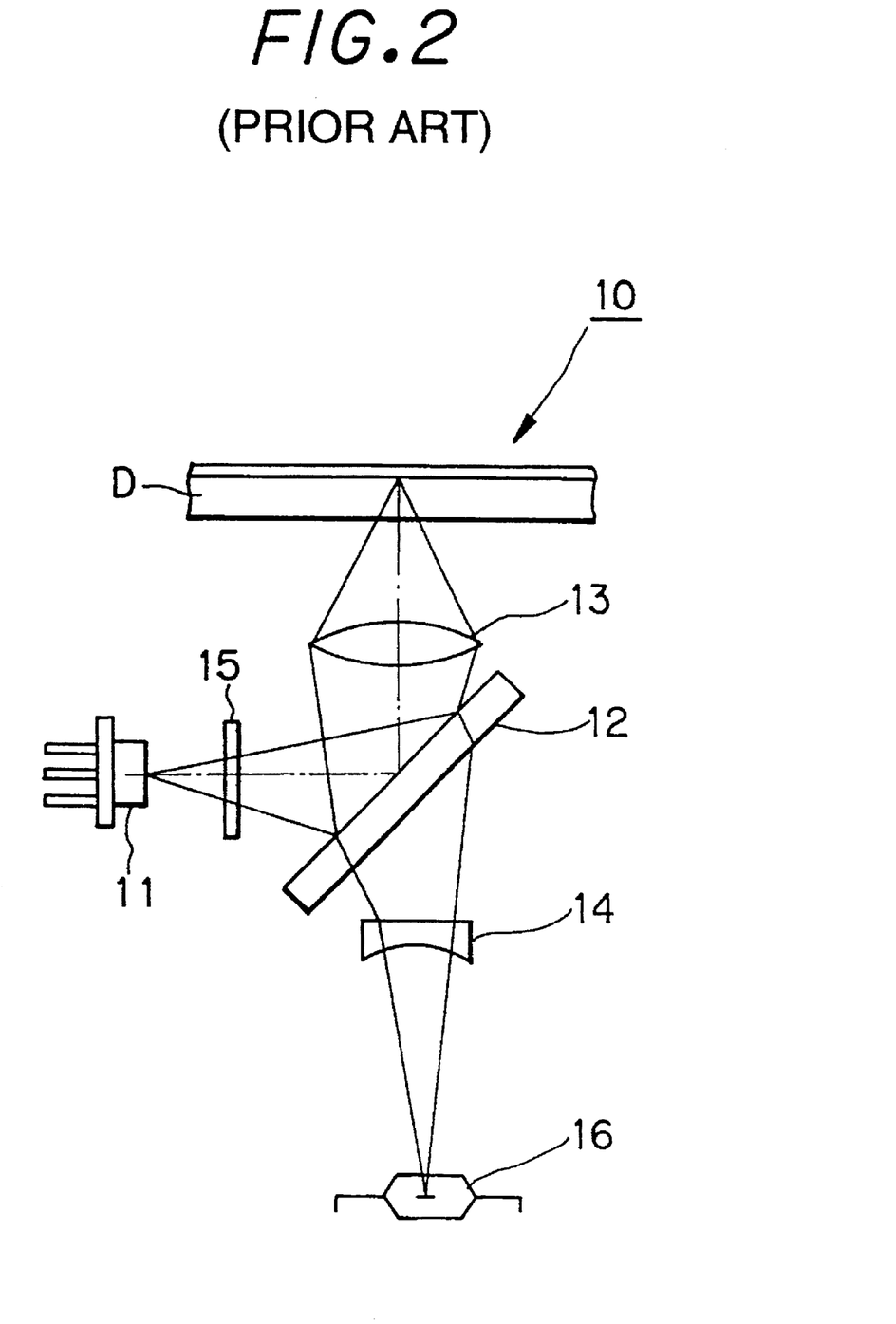
FIG. 2 shows a schematically drawn structure of another prior art optical head.

In the case of a read-only type optical discs, e.g., a so-called compact disc or an optical video disc, on the other hand, an optical head 10 for reading out information signals from these read-only discs can be fabricated, for example, in a constitution shown in FIG. 2. Referring to FIG. 2, a light beam emitted from a light beam source, i.e., a semiconductor laser 11, is divided into at least three light beams by a diffraction grating 15. The three light beams, i.e., the zeroth order diffraction light beam, the positive first order diffraction light beam, and the negative first order diffraction light beam thus generated by the grating 15 are deflected at the angle of 90° at a beam splitter 12 of a parallel plane type, and are further introduced into an objective lens 13. The beam splitter 12 for use herein is, in general, a non-polarizing beam splitter oriented at an angle of 45° with respect to the optical axis of an objective lens 13. The objective lens 13 converges the light beam on one point of a signal recording surface of a rotation-driven optical disc D. More accurately, the zeroth order diffraction light beam is focused on the track of the signal recording surface, while the positive and the negative first order diffraction light beams are irradiated to the front and the back of the irradiation point of the zeroth order diffraction light beam in such a manner that it may be interposed between the irradiation points of the positive and the negative first order diffraction light beams. The light beam reflected by the signal recording surface of the optical disc D, i.e., the reflected light beam, is introduced again to the beam splitter 12 via the objective lens 13. Stigmatic aberration for the focus detection occurs on the reflected light beam during its transmission through the beam splitter 12. The output reflected light beam from the beam splitter 12 is then focused on the photoreceptor plane of the photodetector 16 via a concave lens 14. The use of a concave lens 14 not only shortens the optical path of the reflected light beam between the output edge plane of the beam splitter 12 and the photodetector 16 because the use thereof increases magnification, but also allows the reflected light beam to be focused on the photoreceptor plane of the photodetector 16 because the lens 14 can be moved to adjust its position along the optical axis of the objective lens 13. The photoreceptor plane of the photodetector 16 consists of a plurality of photoreceptor portions to accept focusing error signals and tracking error signals.

As described in the foregoing, the optical head 10 of the constitution above is characterized in that a divergent light beam emitted from a semiconductor laser element 11 is introduced into the beam splitter 12 as it is via the diffraction grating 15. The light beam deflected at the angle of 90° and reflected by the beam splitter 12 is irradiated to focus on the signal recording surface of the optical disc D using the objective lens 13. The reflected light beam from the signal recording surface is introduced again to the beam splitter 12 via the objective lens 13. The light beam transmitted through the beam splitter 12 is focused on the photoreceptor plane of the photodetector via the concave lens 14. Thus, while a focusing error signal based on the output signal from the plurality of photoreceptor portions of the photodetector 16, which had received the zeroth diffraction light beam, and a signal from the read-out of the information recorded on the optical disc D are generate, a tracking error signal is produced at the same time based on the output signal from a plurality of photoreceptor portions which had received the positive and the negative first order diffraction light beams.

The optical heads described above with reference to FIGS. 1 and 2, however, still have the following problems to be solved. Referring to the optical head 1 illustrated in FIG. 1, the dielectric layer constituting the boundary plane of the beam splitter 5 is imparted with polarization characteristics to enhance the rotation angle of the polarization plane of the reflected light beam reflected from the signal recording surface of the magneto-optical disc MO.

More specifically, the dielectric layer provided on the boundary plane of the beam splitter 5 is designed as such that it may yield a transmittance of the P-polarization component (TP) of 65%, a reflectivity of the P-polarization component (RP) of 30%, and a reflectivity of the S-polarization component (RS) of 95% or higher. In this manner, the desired enhancement ratio can be obtained.

However, the aforementioned dielectric layer, which changes the polarization state of the light beams and which is provided on the boundary plane of the aforementioned beam splitter 5, has an extremely large angle dependence. Accordingly, this dielectric layer is placed within parallel light beams as illustrated in FIG. 1. It then follows that at least the light beams passing through the beam splitter 5 are first converted into parallel light beams.

It can therefore be seen from the foregoing that any system using a semiconductor laser element as the light beam source requires an additional optical element, specifically a collimator lens in the case illustrated in FIG. 1, for converting the divergent light beam irradiated from the semiconductor laser into parallel light beams. Furthermore, it is also necessary to include optical elements including, for example, a lens for focusing the light beams irradiated from the beam splitter. Accordingly, the optical head of the type above requires additional optical components to make a compact optical head unfeasible.

On the other hand, the structure of the optical head 10 shown in FIG. 2 is simple. However, since a non-polarizing beam splitter is used, there is no enhancement in the rotation angle of the polarization plane of the reflected light beam. Accordingly, an optical head of this type yields a low CN (Carrier to Noise) ratio, and hence, is not suitable for reading out information signals recorded on a magneto-optical disc at high precision.

Referring again to FIG. 1, the optical head 1 has an artificial quartz ($SiO_2$) as the Wollaston prism. The difference of indices of refraction $\Delta n$, as expressed by the equation below, of this Wollaston prism upon using a light beam source with a wavelength $\lambda$ of 780 nm is about 0.0089:

$$\Delta n = n_e - n_o$$

where, $n_e$ is the index of refraction of an extraordinary light beam, and $n_o$ is the same of an ordinary light beam. In the case of a Wollaston prism using an artificial quartz, the separating angle between the extraordinary light beam and the ordinary light beam is about one degree when the prism is adhered at an angle of 45° with respect to the crystallographic orientation.

Thus again, if a compact optical head were to be implemented by the constitution above, the Wollaston prism should be provided at a thickness of at least 4 mm. Accordingly, a compact head cannot be accomplished as long as it is based on this constitution.

SUMMARY OF THE INVENTION

It is, therefore, and object of the present invention to provide an optical head apparatus which resolves the aforementioned problems.

According to an embodiment of the present invention, there is provided an optical head apparatus for a magneto-optical recording medium, which includes a light beam source, an objective lens, a separating optical system, and a photodetector, wherein, the objective lens is provided to irradiate an output light beam from a light beam source as a focused light beam on the surface of the signal recording surface of a magneto-optical recording medium; the separating optical system separates the light beam emitted by the light beam source from a reflected light beam re-irradiated from the signal recording surface of the magneto-optical recording medium via the objective lens; and the photodetector receives the reflected light beam thus separated by the separating optical system. The separating optical system also includes an enhancement element which apparently increases the Kerr rotation angle of the reflected light beam.

According to another embodiment of the present invention, there is provided an optical head apparatus for a magneto-optical recording medium, which includes a light beam source, an objective lens, a separating optical system, and a photodetector, wherein, the objective lens is provided for irradiating a light beam radiated from a light beam source as a focused light beam on the surface of the signal recording surface of a magneto-optical recording medium; the separating optical system separates the light beam emitted by the light beam source from a reflected light beam reflected by the signal recording surface of the optical recording medium and passed through the objective lens; and the photodetector receives the reflected light beam from the signal recording surface and separated by the separating optical system. The separating optical system further includes a lithium niobate Wollaston prism placed in the photodetector side of the optical path of the reflected light beam reflected by the signal recording surface.

The present invention provides a simple-structured compact optical head.

The present invention also provides an optical head equipped with an enhancement element which increases the apparent Kerr rotation angle of the reflected light beam. Accordingly, the present invention implements an optical head having a large CN ratio and favorable read-out and reproduction characteristics.

The present invention further provides an optical head having a thin Wollaston prism using lithium niobate. Accordingly, a very compact optical head as a whole can be realized.

BRIEF DESCRIPTION OF THE DRAWINGS

The invention will be more readily understood with reference to the accompanying drawings, wherein:

FIGS. 5(A) to 5(C) each schematically show modified types of the enhancement element according to the present invention, where

FIGS. 9(A) to 9(C) are each explanatory drawings to show the structure of a Wollaston prism according to the present invention, wherein.

DESCRIPTION OF THE INVENTION

The present invention is illustrated in greater detail referring to the drawings. In the non-limiting examples below, reference is made particularly to embodiments in which the optical heads according to the present invention are applied to magneto-optical recording medium such as a magneto-optical disc. It should be understood, however, that the present invention is not to be construed as being limited thereto.

Figure 3:
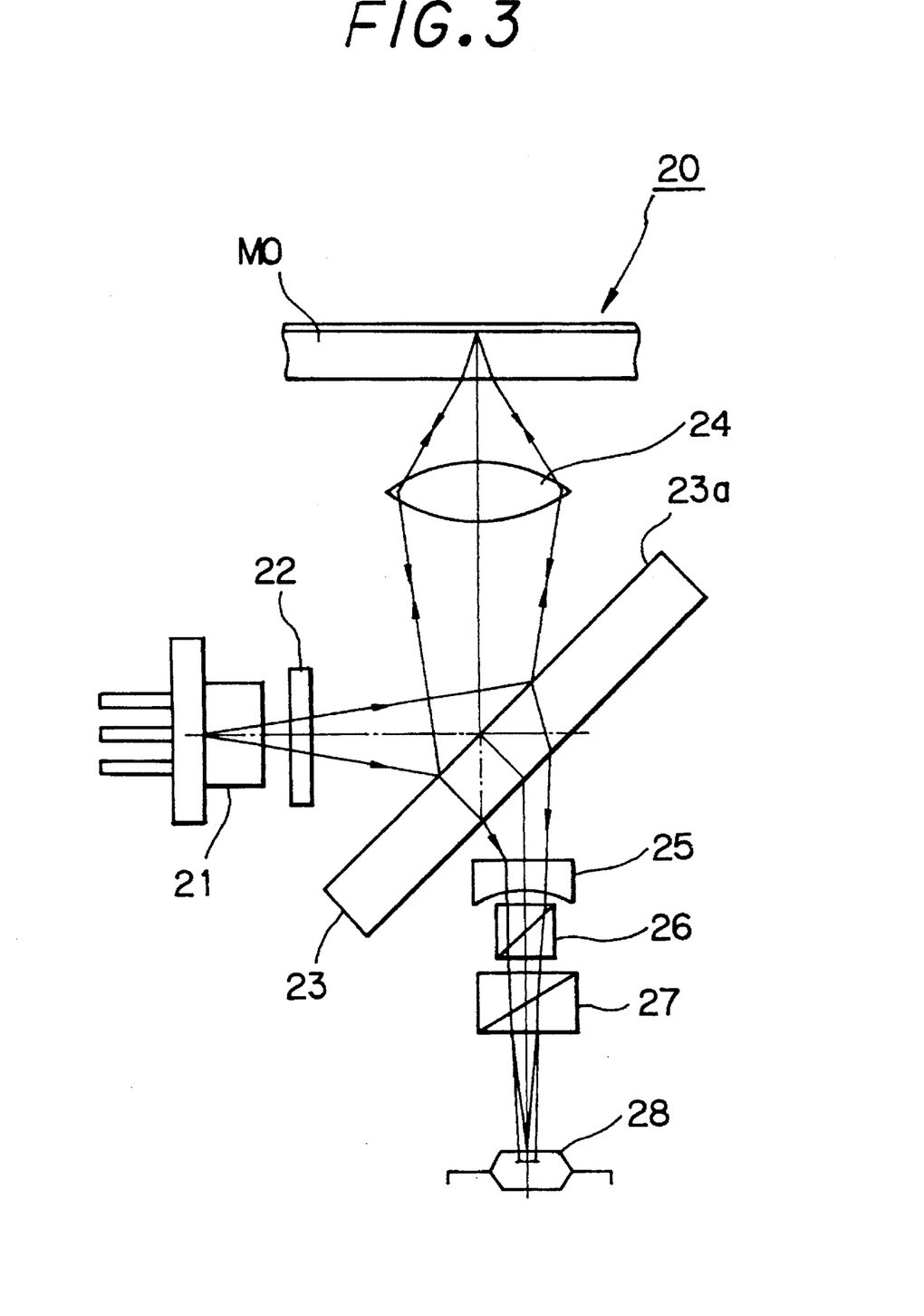
FIG. 3 shows a schematically drawn structure of an optical head according to a first embodiment of the present invention.

Referring to FIG. 3, an optical head according to a first embodiment of the present invention is described. An optical head 20 illustrated in FIG. 3 has a number of optical elements described below. A light beam, emitted from a semiconductor laser element 21 which functions as a light beam source, is introduced as it is in the state of a divergent light beam into a beam splitter 23 via a diffraction grating 22. The light beam emitted from the semiconductor laser 21 is divided into at least three light beams by the diffraction grating 22, and irradiated to the beam splitter 23. The three light beams, i.e., the zeroth order diffraction light beam, the positive first order diffraction light beam, and the negative first order diffraction light beam thus generated by the grating 22, which are shown by a single light beam in the drawing for simplification, are deflected at the angle to 90° and reflected at the same time by the beam splitter 23. The beam splitter 23 used herein is a non-polarizing beam splitter of a parallel plane type, which includes parallel planes made of a material such as a glass and a multilayered film formed on the incident plane 23a which receives the light beam from the semiconductor laser element 21 and the reflected light beam reflected by the magneto-optical disc MO. This multilayered film has no polarizing effects. The beam splitter 23 is oriented at an angle of 45° with respect to the optical axis passing through the objective lens 24. The laser light beam is deflected at the angle of 90° on encountering the beam splitter 23 and is further introduced into an objective lens 24. The objective lens 24 converges the light beam on one point of a signal recording surface of a magneto-optical disc MO. More accurately, the zeroth order diffraction light beam is focused on the track of the signal recording surface, while the positive and the negative first order diffraction light beams are irradiated to the front and the back of the irradiation point of the zeroth order diffraction light beam in such a manner that it may be interposed between the irradiation points of the positive and the negative first order diffraction light beams. The reflected light beam, i.e., the reflected light beam generated by the signal recording surface of the magneto-optical disc MO have their polarization planes rotated by Kerr effect. Accordingly, the reflected light beam is introduced again to the beam splitter 23 via the objective lens 24. Stigmatic aberration for the focus detection is generated on the reflected light beam during its transmission through the beam splitter 23.

A concave lens 25 is provided as an intermediate lens. The concave lens 25 functions principally for shortening the optical path of the reflected light beam between the output edge plane of the beam splitter 23 and the photodetector to be described hereinafter. Furthermore, this concave lens 25 allows the reflected light beam to be focused on the photoreceptor plane of the photodetector 28 while maintaining the reflected light beam in a focused state and the focusing error signal null, because the concave lens 25 can be moved to finely adjust its position along the optical axis of the objective lens 24.

An enhancement element 26 includes a multilayered dielectric film designed as such that it may yield a transmittance of the S-polarization component (TS) of about 30% and a transmittance of the P-polarization component (TP) of approximately 100%. The multilayered dielectric film is provided by means of deposition such as vapor deposition and sputtering, on the position corresponding to the boundary plane of the either of a pair of prisms constituting the enhancement element 26. A cubic-shaped enhancement element 26 can be implemented by adhering the pair of prisms.

Figure 4:
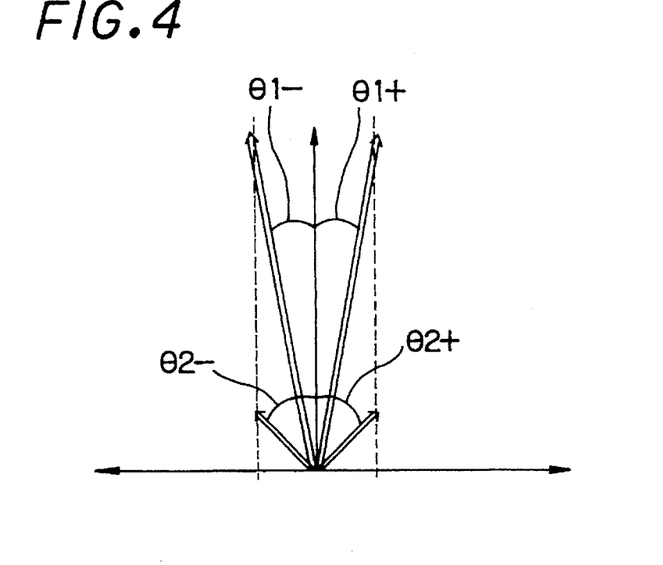
FIG. 4 shows the relation between the Kerr rotation angles for an incident beam and a reflected light beam in an enhancement element according to the present invention.

The Kerr rotation angle $\theta_2$ of a light beam passed through the enhancement element 26 produced in this manner is illustrated in FIG. 4, and can be expressed by the following equation:

$$\theta_2 = \left(\frac{TP}{TS}\right)^{1/2} \cdot \theta_1$$

where, $\theta_1$ represents the Kerr rotation angle of the incident light beam.

The light beam passed through the enhancement element 26 is introduced into a Wollaston prism 27. The Wollaston prism 27 generates a plurality of light beam according to the light beams passed through the enhancement element 26. A photodetector 28 having a plurality of photoreceptor portions is provided to receive, among the plurality of light beams irradiated from the Wollaston prism, at least the light beams necessary for generating error signals such as a focusing error signal and a tracking error signal, or for generating the read-out signals of the magneto-optical disc MO.

Thus, in the optical head 20 described in the foregoing, the light beam emitted from the semiconductor laser element 21 is introduced into the beam splitter 23 via the diffraction grating 22. The light beam reflected and deflected at the angle of 90° by the beam splitter 23 is focused on one point of a signal recording surface of a magneto-optical disc MO via the objective lens 24. The light beam reflected by the signal recording surface of the magneto-optical disc MO, i.e., the reflected light beam, has its rotation angles of the polarization plane rotated by Kerr effect, and re-enter into the beam splitter 23 via the objective lens 24. The reflected light beam irradiated to the beam splitter 23 is transmitted through the beam splitter 23, and is received by the photodetector 28 via the concave lens 25, the enhancement element 26, and the Wollaston prism 27. Among the output signals from the plural photoreceptor planes of the photodetector 28, the output signal from the photoreceptor plane which received the zeroth order diffraction beam is used to generate the focusing error signals, whereas the output signals from the respective photoreceptor planes that received the positive and the negative first order diffraction beam are used in the generation of tracking error signals. The signals generated upon reading out the information signals recorded on the magneto-optical disc MO are generated by using two light beams among the three light beams generated by the Wollaston prism from the zeroth order diffraction light beam.

An apparent increase of Kerr rotation angle is perceived when the reflected light beam passes through the enhancement element 26. This signifies that the three diffraction beams, i.e., the zeroth order diffraction beam and the positive and negative first order diffraction beams, are each further separated into P-polarization, S-polarization, and (P+S) polarization beams attributed to the birefringence induced by the Wollaston prism 27. Thus, nine light beams in total are generated from the Wollaston prism 27. The separation angle in this case amounts to a relatively large value attributed to Kerr effect. The nine light beams are generated by the Wollaston prism 27, but at least five of them, i.e., three zeroth order diffraction beams and two first order diffraction beams, are used to detect and generate, a focusing error signal, a tracking error signal, and a read-out signal from the magneto-optical disc MO, at high precision.

Figure 5A:
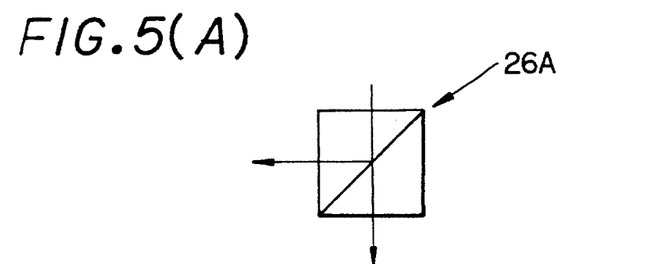
FIG. 5(A) shows a cubic enhancement element.
Figure 5B:
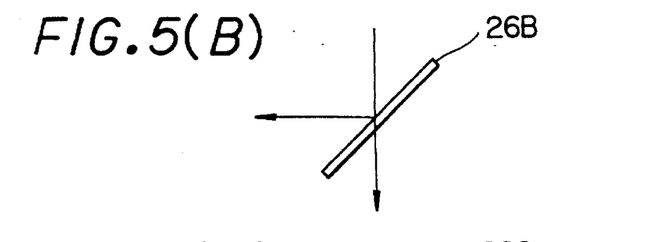
FIG. 5(B) shows a planar enhancement element.

In addition to the cubic-shaped enhancement element 26A shown in FIG. 5(A), other types of an enhancement element can be used. Examples of the enhancement elements are given in FIGS. 5(B) and 5(C). Referring to FIG. 5(B), an enhancement element 26B includes parallel plates made of a glass, etc., and a multilayered dielectric film is formed on one of the planes of the plates, i.e., the incident plane of the reflected light beam or of the light beam irradiated from the light beam source. The multilayered dielectric film is formed on the plate by a deposition process such as vapor deposition and sputtering, and is designed as such that it may yield a transmittance of the P-polarization component (TP) of more than 90%, a transmittance of the S-polarization component (TS) of 30%, and a reflectivity of the S-polarization component (RS) of 65%.

Figure 5C:
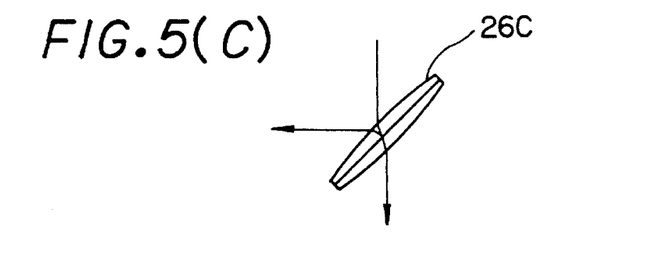
FIG. 5(C) shows an enhancement element including a pair of parallel planar plates.

An enhancement element 26C shown in FIG. 5(C) differs from the enhancement element 26A of FIG. 5(A) which includes a pair of prisms adhered together. That is, the enhancement element 26C includes a pair of parallel plated adhered together. In the same manner as in the case of the enhancement element shown in FIG. 5(A), a multilayered dielectric film is provided between the pair of parallel plates by a deposition process such as vapor deposition or sputtering, in such a manner that it may yield a transmittance of the P-polarization component (TP) of more than 95%, a transmittance of the S-polarization component (TS) of 30%, and a reflectivity of the S-polarization component (RS) of 65%. The cubic-shaped enhancement element 26A differs from an ordinary polarization beam splitter in that it need not control the phase difference between the P-polarization component and the S-polarization component. Similar to the case of the enhancement element 26A, the enhancement element 26C yields a sufficient angle dependence of transmitted light beam, and a large Kerr rotation angle. Yet, the production cost thereof can be reduced as compared with the cubic-shaped enhancement element 26A. The enhancement element 26B yields a transmitted light beam having a relatively low angle dependence, however, the CN ratio is sufficiently high, and the fabrication cost can be reduced as compared with the enhancement element 26C because of its simple structure.

Figure 6:
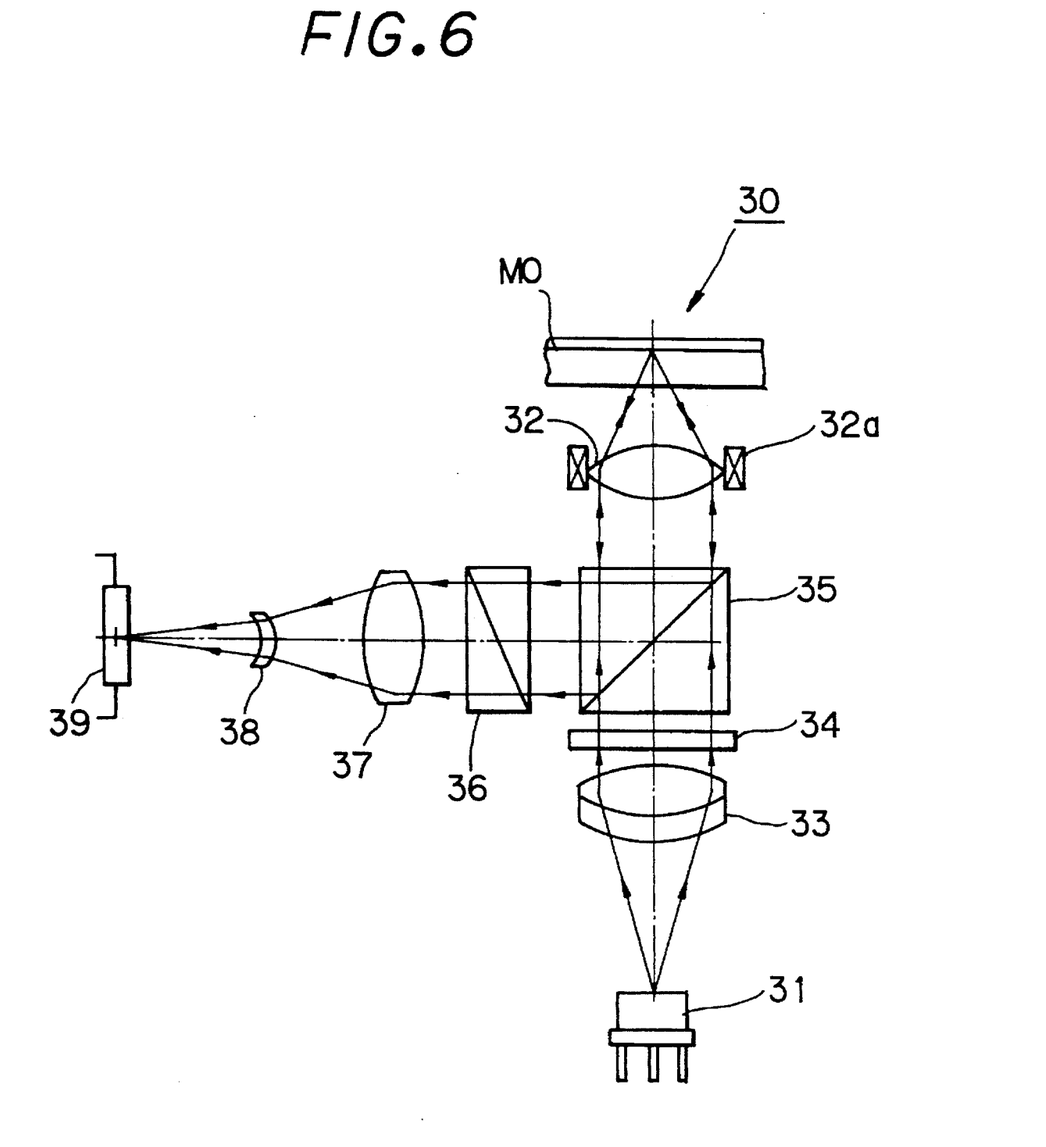
FIG. 6 shows a schematically drawn structure of an optical head according to a second embodiment of the present invention.

Referring to FIG. 6, an optical head according to the second embodiment of the present invention is described below. A light beam, radiated from a semiconductor laser element 31 which functions as a light beam source, is introduced into an objective lens 32, so that the light beam can be focused on the signal recording surface of the magneto-optical disc MO. The objective lens 32 is driven by an actuator 32a along the focus direction and the tracking direction according to the focusing error signal and the tracking error signal. Though not shown in the figures, the same mechanism is provided in the foregoing example referring to a first embodiment as well as in the examples described hereinafter.

A collimator lens 33 converts the divergent light beam emitted from the semiconductor laser element 31 into parallel light beams. A diffraction grating 34 is provided to divide at least three diffraction light beams, i.e., a zeroth order diffraction light beam and a positive and a negative first order diffraction light beams, from the light beam passed through the collimator lens 33. On the signal recording surface of the magneto-optical disc MO, the three diffraction light beams are positioned in such a manner that the irradiation point of the zeroth order diffraction light beam may be interposed between the irradiation points of the positive and the negative first order diffraction light beams. The three divided beams are shown as a single light beam in the figure for simplification. The light beam emitted from a semiconductor laser element 31 is separated from a reflected light beam from the signal recording surface of the magneto-optical disc MO by a beam splitter 35. In the present example according to a second embodiment of the present invention, the beam splitter 35 functions as an enhancement element. More specifically, the beam splitter 35 according to the present embodiment includes a pair of optical prisms and a multilayered dielectric film provided therebetween by means of a deposition process such as vapor deposition and sputtering. The multilayered dielectric film is designed as such that it may yield a transmittance of the P-polarization component (TP) of 45%, a transmittance of the S-polarization component (TS) of several percentage, a reflectivity of the P-polarization component (RP) of 45%, and a reflectivity of the S-polarization component (RS) of 90%.

A Wollaston prism 36 generates a plurality of beams from the reflected light beam. The reflected light beam from the Wollaston prism 36 is focused on the photoreceptor plane of a photodetector, which is described hereinafter, by means of an imaging lens 37. The imaging lens 37 focuses the light beam in a completely focused state, i.e., at a state yielding a null focusing error signal.

A multi-purpose lens 38 is further provided to impart astigmatic aberration to the reflected light beam from the imaging lens 37 for the detection of focusing error. The multipurpose lens 38 also shortens the optical path of the reflected light beam. A photodetector 39, whose photoreceptor plane is included a plurality of photoreceptor portions, receives the plurality of output light beams from the Wollaston prism 36 originated from the reflected light beam. In the similar manner as in the example according to the first embodiment, each of the error signals, i.e., a focusing error signal and a tracking error signal, and a signal according to the read-out signal from the information signal recorded on the signal recording surface of the magneto-optical disc MO are generated based on the output signal provided by each of the photodetector portions.

In the optical head 30 according to the present embodiment as described in the foregoing, the P-polarization light beam emitted from the semiconductor laser element 31 is converted into parallel light beams by the collimator lens 33. The resulting parallel light beams thus obtained are focused again on the signal recording surface of a magneto-optical disc MO by the objective lens 32 via the diffraction grating 34 and the beam splitter 35. The light beams reflected by the signal recording surface, i.e., the reflected light beams have their polarization planes rotated along the direction of the magnetic domains in the signal recording surface. Thus, each reflected light beam results in a light beam inclusive of an S-polarization component. Each reflected light beam is then introduced to the beam splitter 35 again via the objective lens 32.

Each reflected light beam is deflected by the beam splitter 35 at the angle of 90°, and at the same time, is enhanced by the multilayered dielectric film provided to the beam splitter 35. The reflected light beam thus enhanced advances through the Wollaston prism 36, the imaging lens 37, the multi-purpose lens 38, and is finally received by the photodetector 39. The aforementioned signals are each generated according to the output signal of the photodetector 39.

In the case of an optical element according to the second embodiment of the present invention, the light beam irradiated to the magneto-optical disc MO has substantially the P polarization component alone, and the enhancement ratio of 1.4 or higher can be achieved. Thus, as a result, a sufficiently high CN ratio can be achieved by the optical head according to the second embodiment of the present invention.

Figure 7:
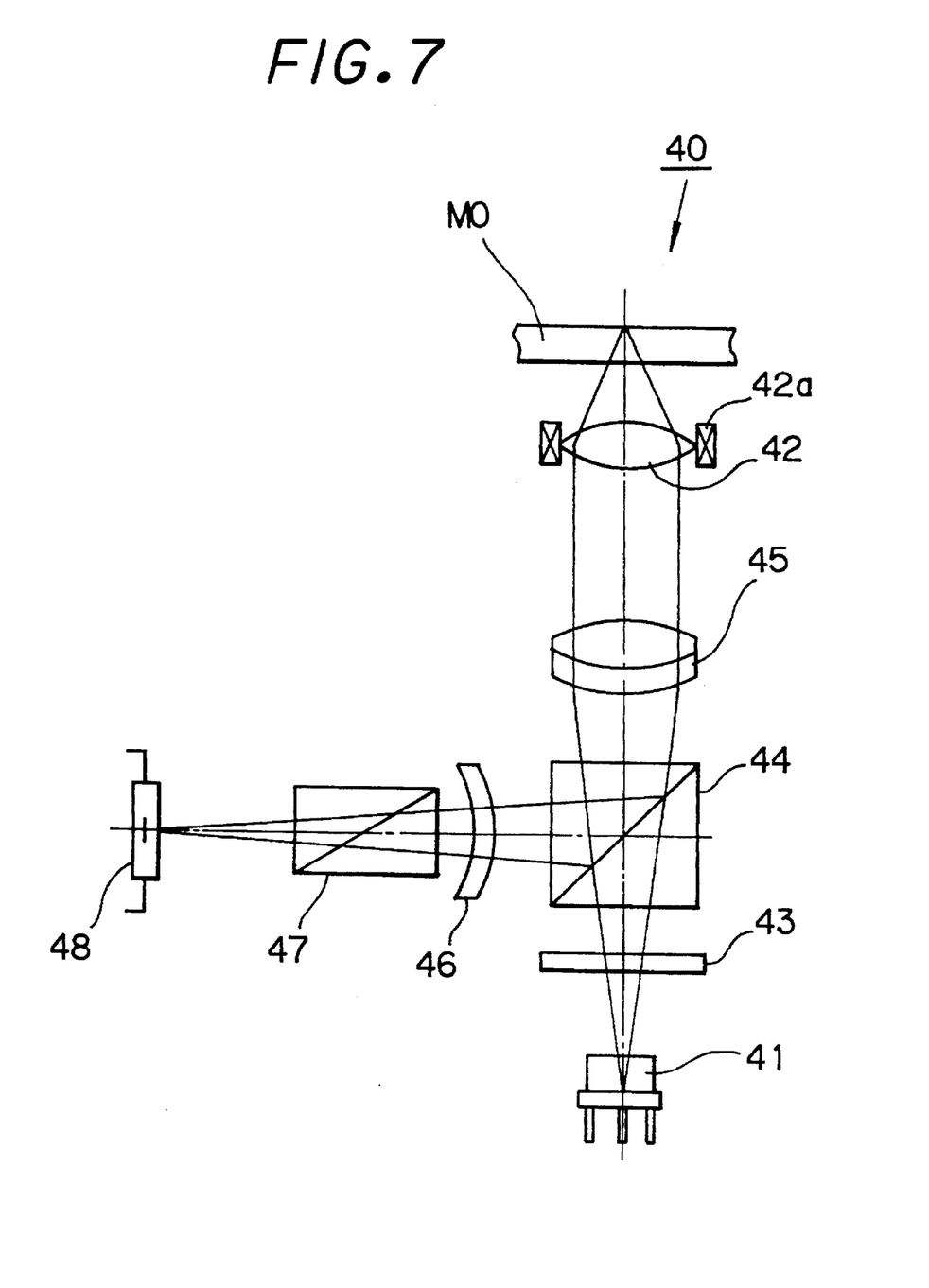
FIG. 7 shows a schematically drawn structure of an optical head according to a third embodiment of the present invention.

Referring to FIG. 7, an optical head according to the third embodiment of the present invention is described below. An optical head 40 has a semiconductor laser element 41 as a light beam source. The output light beam from the semiconductor laser element 41 is converged on a single point on the signal recording surface of the magneto-optical disc MO by means of an objective lens 42. The objective lens is driven by an actuator 42a along the focus direction and the tracking direction. A servo signal for the focusing servo and another servo signal for the tracking servo are supplied to the actuator 42a in accordance with the focusing error signal and the tracking error signal.

A diffraction grating 43 is provided to divide at least three diffraction light beams, i.e., a zeroth order diffraction light beam and a positive and a negative first order diffraction light beams, from the divergent light beam emitted from the semiconductor laser element 41. On the signal recording surface of the magneto-optical disc MO, the three diffraction light beams are positioned in such a manner that the irradiation point of the zeroth order diffraction light beam may be interposed between the irradiation points of the positive and the negative first order diffraction light beams. For simplification, the three divided beams are shown as a single light beam in FIG. 7.

The divergent light beam diffracted by the diffraction grating 43 is irradiated to a beam splitter 44. In the present example according to a third embodiment of the present invention again, the beam splitter 44 functions as an enhancement element. More specifically, the beam splitter 44 according to the present embodiment includes a pair of optical prisms and a multilayered dielectric film provided therebetween by means of a deposition process such as vapor deposition and sputtering. The multilayered dielectric film is designed as such that it may yield a transmittance of the P-polarization component (TP) of 45%, a reflectivity of the P-polarization component (RP) of 45%, a transmittance of the S-polarization component (TS) of several percentage, and a reflectivity of the S-polarization component (RS) of 90%.

A collimator lens 45 is provided to convert the light beams emitted as a divergent light beam from the semiconductor laser element 41 and transmitted through the beam splitter 44 into parallel light beams.

A multi-purpose lens 46 is further provided to impart stigmatic aberration to the reflected light beam reflected from the signal recording surface and separated by the beam splitter 44. The multi-purpose lens 46 also shortens the optical path of the reflected light beam ranging from the irradiation front of the beam splitter 44 to the photodetector, which is described hereinafter. A Wollaston prism 47 generates a plurality of beams according to a reflected light beam reflected by the recording surface of the magneto-optical disc MO in the same manner as in the first embodiment. A photodetector 48 has a plurality of photoreceptor planes for receiving a plurality of the light beams generated by the Wollaston prism 47. The focusing error signal, the tracking error signal, and a read-out signal from the information signal recorded on the signal recording surface of the magneto-optical disc MO are generated according to the output signal from the photodetector 48.

In the optical head 40 according to the present embodiment, as described in the foregoing, the divergent P-polarized light beam emitted from the semiconductor laser element 41 is converted as it is into parallel light beams by the collimator lens 45 via the diffraction grating 43 and the beams splitter 44. The light beam converted into parallel light beams by the collimator lens 45 are focused by means of the objective lens 42 on a single point of the signal recording surface of the magneto-optical disc MO. Then, each of the light beams undergoes, due to Kerr effect, rotation of its polarization plane of the incident light beam along the direction of the magnetic domains of the signal recording surface. In this manner, the light beam includes an S-polarization component. The light beams reflected by the signal recording surface of the magneto-optical disc MO, i.e., the reflected light beams, are introduced into a beam splitter 44 via the objective lens 42 and the collimator lens 45 again. The light beams are deflected by the angle of 90°, and at the same time, are enhanced by the beam splitter 44. The reflected light beams thus enhanced by the beam splitter 44 are received by the photodetector 48 after passing through the multi-purpose lens 46 and the Wollaston prism 47.

Similar to the example according to the second embodiment, the optical head according to the third embodiment of the present invention provides a light beam irradiated to the magneto-optical disc MO having substantially the P-polarization component alone and an enhancement ratio of 1.4 or higher. Thus, as a result, the optical head according to the third embodiment of the present invention not only achieves a sufficiently high CN ratio, but also is made compact as a whole because the Wollaston prism is built into the optical path of the convergent light beam.

Furthermore, the optical heads according to the second and the third embodiments of the present invention are advantageous in that the number of components can be reduced and that the structure can be simplified, because the enhancement element and the beam splitter need not be established separately.

Figure 8:
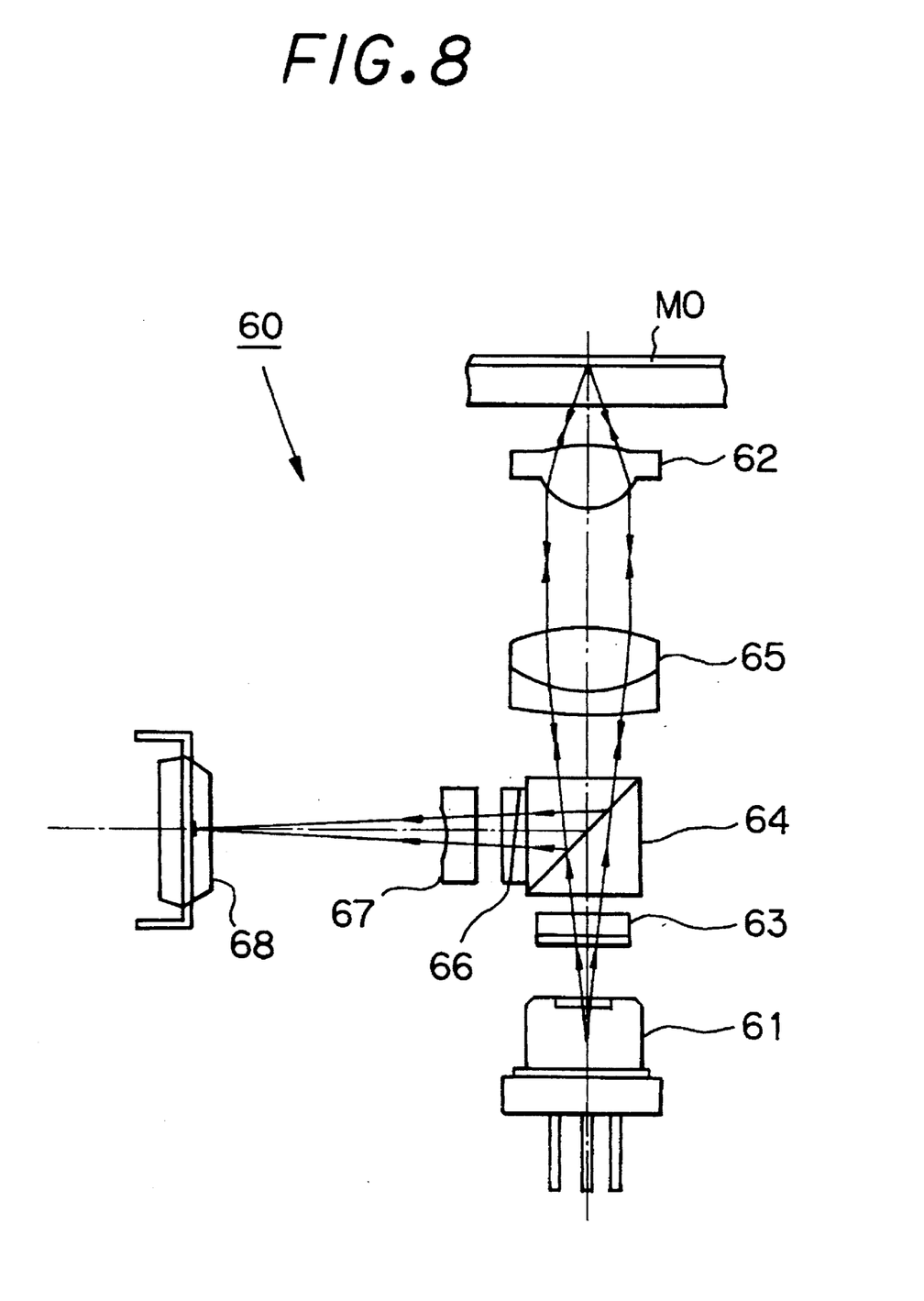
FIG. 8 shows a schematically drawn structure of an optical head according to a fourth embodiment of the present invention.

Referring to FIG. 8, an optical head according to the fourth embodiment of the present invention is described below. An optical head 60 according to the present embodiment has a semiconductor laser element 61 as the light beam source. The light beam radiated from the semiconductor laser element 61 is converged on a single point of the signal recording surface of the magneto-optical disc MO by an objective lens 62. The objective lens 62 may be a single lens having aspherical surfaces on both sides. The light beam irradiated by the semiconductor laser element 61 is first divided into at least three diffraction light beam i.e., a zeroth order diffraction light beam and a positive and a negative first order diffraction light beams, by a diffraction grating 63 from the light beam emitted from the semiconductor laser element 61. For simplification, the three divided light beams are shown as a single light beam in FIG. 8. A beam splitter 64 is provided to separate the light beams emitted from semiconductor laser element 61 from the reflected light beams from the signal recording surface of the magneto-optical disc MO. The divergent light beam transmitted through the beam splitter 64 is converted into parallel light beams by a collimator lens 65. A Wollaston prism 66 is established on the beam splitter 64, on the end plane for emitting the reflected light beam. The Wollaston prism 66, including a pair of optical prisms 66a, 66b which are each made of lithium niobate (LiNbO$_3$), can be provided to the beam splitter 64 by adhesion, etc. The difference of indices of refraction Δn of this Wollaston prism is found to be:

Δn=n$_e$−n$_o$=0.08, where, n$_e$, the index of refraction of an extraordinary light beam, is 2.179 and n$_o$, the same of an ordinary light beam, is 2.259. This difference of indices of refraction is a digit larger as compared with that of an artificial quartz (SiO$_2$).

Figure 9A:
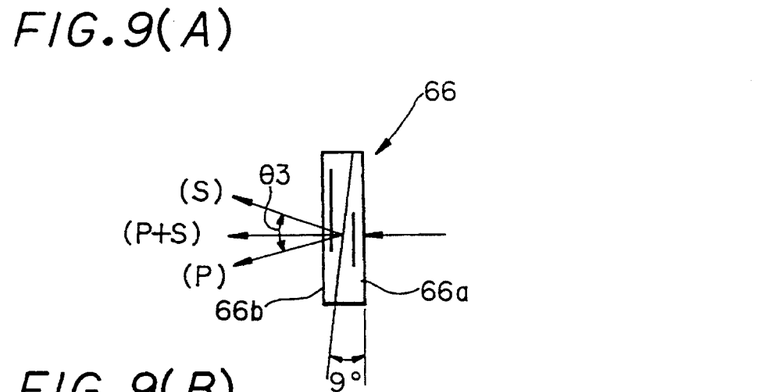
FIG. 9(A) is provided as an explanatory means showing the generation of a plurality of light beams upon incidence of a light beam to a Wollaston prism.
Figure 9B:
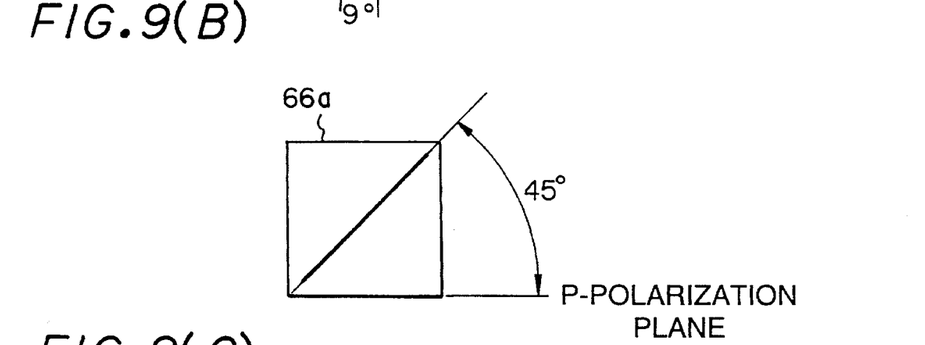
FIG. 9(B) is provided as another explanatory means showing crystal optical axes on the incident beam side of a Wollaston prism.

Accordingly, the angle of the apex at the joint between the adhered prisms 66a and 66b of the Wollaston prism 66 can be lowered considerably to a value as small as, for example, 9 degrees. This can be seen in FIG. 9(A). Accordingly, not only the thickness of the Wollaston prism 66 along the optical axis can be reduced, but also the thickness along the optical axis of the reflected light beam, which is illustrated in FIG. 8, can be reduced to, for example, 0.85 mm. Thus, the beam separation angle θ$_3$ of the Wollaston prism as shown in FIG. 9(A) can be found to be, for example, 25.3 mrad.

Figure 9C:
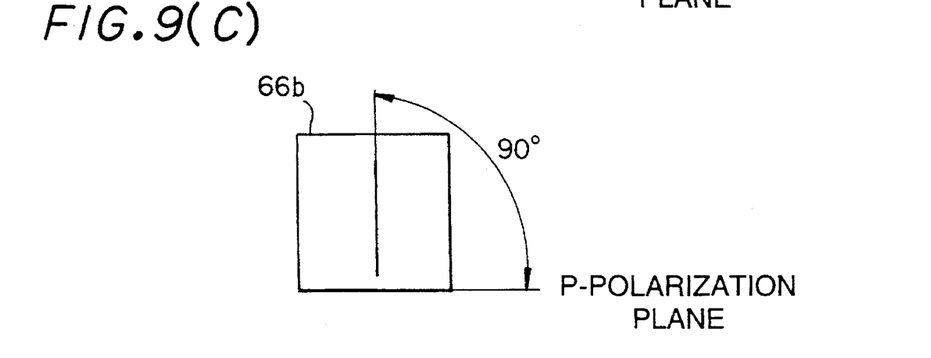
FIG. 9(C) is provided as a still another explanatory means showing crystal optical axes on the output side of a Wollaston prism.

The Wollaston prism 66 according to the present embodiment includes two prisms 66a and 66b adhered to each other. The prism 66a on the side of an incident reflected light beam is rotated as such that the crystal optical axis thereof may make an angle of 45° with respect to the P-polarization plane of the incident light beam. The prism 66b provided on the output side for a light beam has, as shown in FIG. 9(C), its crystal optical axis rotated at an angle of 90° with respect to the P-polarization plane. The prisms 66a and 66b are adhered in such a manner that the respective crystal optical axes thereof may make the angle of 45° and 90°, respectively, with respect to the P-polarization plane of the incident light beam. Thus, as shown in FIG. 9(A), the incident light beam is generated by the Wollaston prism 66 into three light beams each containing the polarization components, namely, P, S, and (P+S).

A multi-purpose lens 67 is provided to impart stigmatic aberration to the output light beam of the Wollaston prism 66. The multi-purpose lens 67 also shortens the optical path of the reflected light beam in the same manner as in the previous example, by increasing the magnification.

A photodetector 68 has a plurality of photoreceptor planes for receiving a plurality of the light beams generated by the Wollaston prism 66. A focusing error signal, a tracking error signal, and a read-out signal from the information signal recorded on the signal recording surface of the magneto-optical disc MO are generated according to the output signal from the photodetector 68.

In the optical head 60 according to the present embodiment, the P-polarized light beam emitted from the semiconductor laser element 61 is introduced as a divergent light beam as it is into the diffraction grating 63 to generate at least three light beams, i.e., the zeroth order diffraction light beam and the positive and the negative first order diffraction light beams. The thus generated light beams are transmitted through the beam splitter 64 and converted into parallel light beams by the collimator lens 65. The light beams converted by the collimator lens 65 into parallel light beams are focused on the signal recording surface of a magneto-optical disc MO by the objective lens 62. In the signal recording surface, the zeroth diffraction light beam irradiates a beam spot on the track, accompanied by slightly offset beam spots attributed to the positive and the negative first order diffraction light beams located in the front and the back thereof. The light beams reflected by the signal recording surface, i.e., the reflected light beams undergo, due to Kerr effect, rotation of their polarization planes of the light beam along the direction of the magnetic domains of the signal recording surface. In this manner, the light beams include an S-polarization component. The reflected light beam are introduced into the beam splitter 64 again via the objective lens 62 and the collimator lens 65. The optical path of the reflected light beams are further deflected at the angle of 90° by the beam splitter 64, and introduced to the Wollaston prism 66. During transmission through the Wollaston prism 66, the reflected light beams are separated into three light beams, i.e., P-polarization, S-polarization, and (P+S) polarization beams, attributed to the birefringence effect of the Wollaston prism 66. Since the three diffraction beams, i.e., the zeroth order diffraction beam and the positive and negative first order diffraction beams, are each further resolved into P-polarization, S-polarization, and (P+S) polarization beams attributed to the birefringence induced by the Wollaston prism 66, nine light beams in total are generated as a result from the Wollaston prism 66. The generated light beams are received by the photodetector 68 via a multipurpose lens 67. Among the nine light beams generated by the Wollaston prism 66, at least five of them, i.e., three zeroth order diffraction beams and two first order diffraction beams, are used in the practical signal processing. More specifically, the output signal from a plurality of photoreceptors which receive the light beam attributed to the center zeroth order diffraction is used to generate the focusing error signals; the output signal from the photoreceptor portion which receive two beams attributed to the zeroth order diffraction beam and located at both sides of the center zeroth order diffraction beam is used to generate the read-out signal from the information signal recorded on the magneto-optical disc MO; and the two light beams based on the first order diffraction is used for tracking error signals.

According to the fourth embodiment of the present invention, a thinner Wollaston prism can be employed by using a material having a relatively large refraction index, i.e., lithium niobate. Thus, the optical path between the Wollaston prism 66 and the photodetector 68 can be shortened. As a result, a compact optical head 60 can be realized.

The beam splitter 64 may also function as an enhancement element in the same manner as in the case described for the third embodiment of the present invention. In such a case, the beam splitter 64 should be constructed from a pair of optical prisms and a multilayered dielectric film. The multilayered dielectric film in this case is preferably designed as such that it may yield a transmittance of the P-polarization component (TP) of 45%, a reflectivity of the P-polarization component (RP) of 45%, a transmittance of the S-polarization component (TS) of several percentage, and a reflectivity of the S-polarization component (RS) of 90%.

While the invention has been described in detail and with reference to specific embodiments thereof, it will be apparent to one skilled in the art that various changes and modifications can be made therein without departing from the spirit and scope thereof.

What is claimed is:

1. An optical head apparatus for a magneto-optical recording medium, said apparatus comprising:

a light beam source for emitting a light beam;

an objective lens which focuses the light beam emitted from said light beam source to the recording surface of a magneto-optical recording medium;

a separating optical system which separates the light beam emitted from said light beam source from a reflected light beam reflected from the recording surface of the magneto-optical recording medium via said objective lens; and a photodetector for receiving said reflected light beam reflected from the recording surface, being separated by said separating optical system, wherein, said separating optical system comprises an enhancement element for increasing a Kerr rotation angle of the reflected light beam.

2. An optical head apparatus according to claim 1, wherein said enhancement element is placed in an optical path to said photodetector of said reflected light beam separated by said separating optical system.

3. An optical head apparatus according to claim 1, wherein, said separating optical system comprises a beam splitter for resolving the beam into a light beam emitted from said light beam source and a reflected light beam reflected from the recording surface of the magneto-optical recording medium via said objective lens, and said enhancement element is provided in a boundary plane of said beam splitter.

4. An optical head apparatus according to claim 1, wherein, said separating optical system comprises a beam splitter for resolving the beam into a light beam emitted from said light beam source and a reflected light beam reflected from the recording surface of the magneto-optical recording medium via said objective lens, and said enhancement element is placed in the optical path between said beam splitter and said photodetector.

5. An optical head apparatus according to claim 1, wherein said enhancement element comprises planar optical elements arranged in parallel with one another and tilted at a predetermined angle with respect to an optical axis of said objective lens, and an enhancement layer provided on a side of one of said planar optical elements for receiving the reflected light beam from the recording surface.

6. An optical head apparatus according to claim 1, wherein, said enhancement element comprises a pair of planar optical elements arranged in parallel and tilted at a predetermined angle with respect to an optical axis of said objective lens, and an enhancement layer provided between an output plane for said reflected light beam, provided on a side of one of said pair of planar optical elements, and an incident plane for receiving said reflected light beam from the recording surface provided in a side of the other of said pair of planar optical elements.

7. An optical head apparatus according to claim 1, wherein, said separating optical system comprises a Wollaston prism made of lithium niobate.

8. An optical head apparatus according to claim 1, wherein, said separating optical system comprises a beam splitter and a Wollaston prism made of lithium niobate and placed between said beam splitter and said photodetector.

9. An optical head apparatus for a magneto-optical recording medium, the apparatus comprising:

a light beam source for emitting a light beam;

diffraction means for dividing the light beam emitted by the light beam source into a plurality of light beams;

an objective lens which focuses the plurality of divided light beams from the diffraction means to the recording surface of a magneto-optical recording medium;

an optical beam separator which separates the plurality of light beams from the diffraction means from a plurality of reflected light beams reflected from the recording surface of the magneto-optical recording medium;

a photodetector for receiving the separated plurality of reflected light beams, and wherein the optical beam separator includes a Kerr rotation angle enhancement element positioned in an optical path of the plurality of reflected light beams received by the photodetector, the Kerr rotation angle enhancement element being comprised of a multilayered, dielectric film for which the transmittance of P-polarization components of reflected light beams incident on the enhancement element and passed to the photodetector is at least twice the transmittance of S-polarization components of reflected light beams incident on the enhancement element and passed to the photodetector.

10. An optical head apparatus according to claim 9, wherein the diffraction means divides the light beam emitted by the light beam source into at least three beams.

11. An optical head apparatus according to claim 10, wherein the Wollaston prism is comprised of two prisms adhered to each other, one of the prisms having a crystal optical axis at an angle of 45° with respect to the P-polarization plane of the reflected light beams incident on the enhancement element and the other of the prisms having a crystal optical axis at an angle of 90° with respect to P-polarization plane of the reflected light beams incident on the enhancement element.

12. An optical head apparatus according to claim 9, wherein the enhancement element comprises a Wollaston prism made of lithium niobate.

13. An optical head apparatus according to claim 12, further comprising collimator means provided between the light beam source and the diffraction means for collimating the light beam emitted by the light beam source into a parallel light beam.

14. An optical head apparatus for a magneto-optical recording medium said apparatus comprising:

a light beam source for emitting a light beam;

an objective lens which focuses the light beam emitted from said light beam source to the recording surface of a magneto-optical recording medium;

a separating optical system which separates the light beam emitted from said light beam source from a reflected light beam reflected from the recording surface of the magneto-optical recording medium via said objective lens; and a photodetector for receiving said reflected light beam reflected from the recording surface, and separated by said separating optical system, wherein, said separating optical system comprises a beam splitter for resolving the beam into a light beam emitted from said light beam source and a reflected light beam reflected from the recording surface of the magneto-optical recording medium via said objective lens, and a Wollaston prism made of lithium niobate provided on an output plane of said beam splitter for irradiating said reflected light beam from the recording medium onto said photodetector, and further wherein, said Wollaston prism is formed by adhering a pair of lithium niobate optical prisms to each other, in such a manner that the crystal optical axis of the prism on the side for light beam incidence of said reflected light beam from the recording surface is tilted at an angle of 45° with respect to the polarization plane of said reflected light beam from the recording surface, and that the crystal optical axis of the prism on the side for emitting said reflected light beam from the recording surface is tilted at an angle of 90° with respect to the polarization plane of said reflected light beam from the recording surface.

* * * * *